(12) United States Patent
Bennett

(10) Patent No.: US 11,441,603 B2
(45) Date of Patent: Sep. 13, 2022

(54) BEARING ARRANGEMENT

(71) Applicant: Safran Landing Systems UK Limited, Gloucester (GB)

(72) Inventor: Ian Robert Bennett, Gloucester (GB)

(73) Assignee: Safran Landing Systems UK LTD

( * ) Notice: Subject to any disclaimer, the term of this patent is extended or adjusted under 35 U.S.C. 154(b) by 387 days.

(21) Appl. No.: 16/793,556

(22) Filed: Feb. 18, 2020

(65) Prior Publication Data

US 2020/0271158 A1     Aug. 27, 2020

(30) Foreign Application Priority Data

Feb. 21, 2019  (EP) .................................... 19158646

(51) Int. Cl.
| | | |
|---|---|---|
| *F16C 21/00* | (2006.01) | |
| *F16C 33/30* | (2006.01) | |
| *B64C 25/34* | (2006.01) | |
| *F16C 19/50* | (2006.01) | |

(52) U.S. Cl.
CPC .............. *F16C 21/00* (2013.01); *B64C 25/34* (2013.01); *F16C 19/502* (2013.01); *F16C 33/306* (2013.01); *F16C 2326/43* (2013.01)

(58) Field of Classification Search
CPC ...... F16C 19/502; F16C 21/00; F16C 33/306; F16C 2326/43; B64C 25/34
See application file for complete search history.

(56) References Cited

U.S. PATENT DOCUMENTS

| | | | | |
|---|---|---|---|---|
| 553,588 A | * | 1/1896 | Meyer et al. | ........... F16C 19/50 |
| | | | | 384/451 |
| 2,309,397 A | | 1/1943 | Illmer | |
| 2016/0047412 A1 | | 2/2016 | Stuk et al. | |

FOREIGN PATENT DOCUMENTS

| | | | |
|---|---|---|---|
| DE | 7518183 U | 10/1975 | |
| EP | 3064432 A1 | 9/2016 | |
| FR | 2979612 A1 * | 3/2013 | ............. B64C 25/34 |
| WO | 9716368 A1 | 5/1997 | |
| WO | 2013119210 A1 | 8/2013 | |

OTHER PUBLICATIONS

Extended European Search Report for European Application No. 19 158 646.0, dated Jul. 29, 2019, 7 pages.

\* cited by examiner

*Primary Examiner* — Alan B Waits
(74) *Attorney, Agent, or Firm* — RatnerPrestia

(57) ABSTRACT

A bearing arrangement having: a first element having an inner race and a first bearing surface; a second element, pivotable relative to the first element about a first axis, and having an outer race and a second bearing surface that cooperates with the first bearing surface to form a plain bearing. The bearing arrangement also includes a roller element disposed between the inner and outer races to form a rolling bearing. The inner and outer races are arcuate and subtend an angle of less than 360° about the first axis.

14 Claims, 5 Drawing Sheets

BEARING ARRANGEMENT

This application claims priority to European Patent Application No. EP 19158646.0, filed Feb. 21, 2019, which is incorporated herein by reference.

FIELD

This invention relates to a bearing arrangement and a landing gear incorporating the bearing arrangement.

BACKGROUND

Aircraft landing gears carry substantial loads when the aircraft is on the ground and the weight of the aircraft is supported on their wheels and therefore relatively minor movements of the bearings within the landing gear can generate significant amounts of heat, which may damage the bearings or other components. For example, a taxiing aircraft will roll over uneven surfaces and for the aircraft main landing gear this will result in some relative movement between the bogie beam and shock strut of the main landing gear. Since the main landing gear will carry a substantial loading due to the weight of the aircraft at the same time, the movement can cause significant heat build-up in the bearings between the bogie beam and shock strut.

Whilst various low friction bearing configurations are known, these are typically of greater weight than the plain bearings generally used in aircraft landing gear. Additional weight is undesirable for aircraft landing gear as it has a detrimental effect on the aircraft's fuel consumption. It would therefore be beneficial to provide a lower friction bearing that does not significantly add weight to the landing gear.

SUMMARY

According to a first aspect of the present invention, there is provided a bearing arrangement as set out in claim 1.

With such an arrangement, there is provided a bearing arrangement which may have sufficiently low friction that heat generation may be reduced when the bearing assembly is carrying a substantial radial force in one direction, and the bearing assembly may have a low weight.

The bearing arrangement of the present invention may be suitable for use in a landing gear, for instance between the bogie beam and the shock strut of a landing gear.

The inner and outer races may subtend an angle about the axis of not more than 180°. Thus, the weight of the bearing arrangement can be further reduced and the rolling bearing may carry a substantial portion of the aircraft weight while the aircraft is supported on the landing gear.

The first element may be a journal or a bogie pivot pin and the second element may be a lug.

The first and second bearing surfaces may be arcuate. This may make the plain bearing particularly suited for rotation about a fixed axis.

The first bearing surface and the inner race may form a continuous surface. This may allow the roller element to cooperate with the first bearing surface and the inner race to cooperate with the second bearing surface, such that the bearing arrangement can work over a greater range of angles.

The inner and outer races and the plain bearing may be coplanar in a plane normal to the axis. There may therefore be provided a more compact bearing arrangement.

The bearing assembly may further comprise a tape coupled to the inner or outer race, which at least partially encircles the roller element. The tape arranged in this manner may prevent the roller element from creeping to an eccentric position of the rolling bearing and thus may avoid slippage of the roller element.

The roller element may comprise a toothed gear arranged to engage a corresponding toothed surface of the inner race and/or the outer race. This may reduce undesirable movement of the roller element, such as the roller element or cage migrating or creeping to an end of the race bearing and fouling when the bearing moves, and may avoid the race bearing "bottoming out".

The roller element may be a first roller element and the bearing arrangement may further comprise a second roller element coupled to the first roller element by a cage such that the roller elements maintain a fixed spacing.

The cage may reduce the chance of contact between adjacent roller elements within the rolling bearing.

The inner and outer races may each subtend an angle at the axis which is greater than an angle subtended by first and second ends of the cage. This may allow movement of the roller elements within the bearing arrangement.

The inner and outer races may extend along the axis further than the first and second bearing surfaces may extend along the axis. Thus, friction and, correspondingly, heat generation within the race bearing can be reduced.

According to a second aspect of the invention, there is provided an aircraft landing gear comprising: a bogie beam, a shock strut coupled to the bogie beam by a bogie pivot pin, and the bearing assembly of the first aspect.

The first element may be the bogie pivot pin and the second element may be a lug of the shock strut, and the inner race may be disposed on an upper side of the bogie pivot pin when the landing gear is deployed.

The first element may be the bogie pivot pin and the second element may be a lug of the bogie beam, and the inner race may be disposed on a lower side of the bogie pivot pin when the landing gear is deployed.

BRIEF DESCRIPTION OF THE DRAWINGS

In order to provide a better understanding of the present invention, certain aspects of the invention will be explained below, by way of example only, with reference to the following drawings, in which.

DETAILED DESCRIPTION

Figure 1:
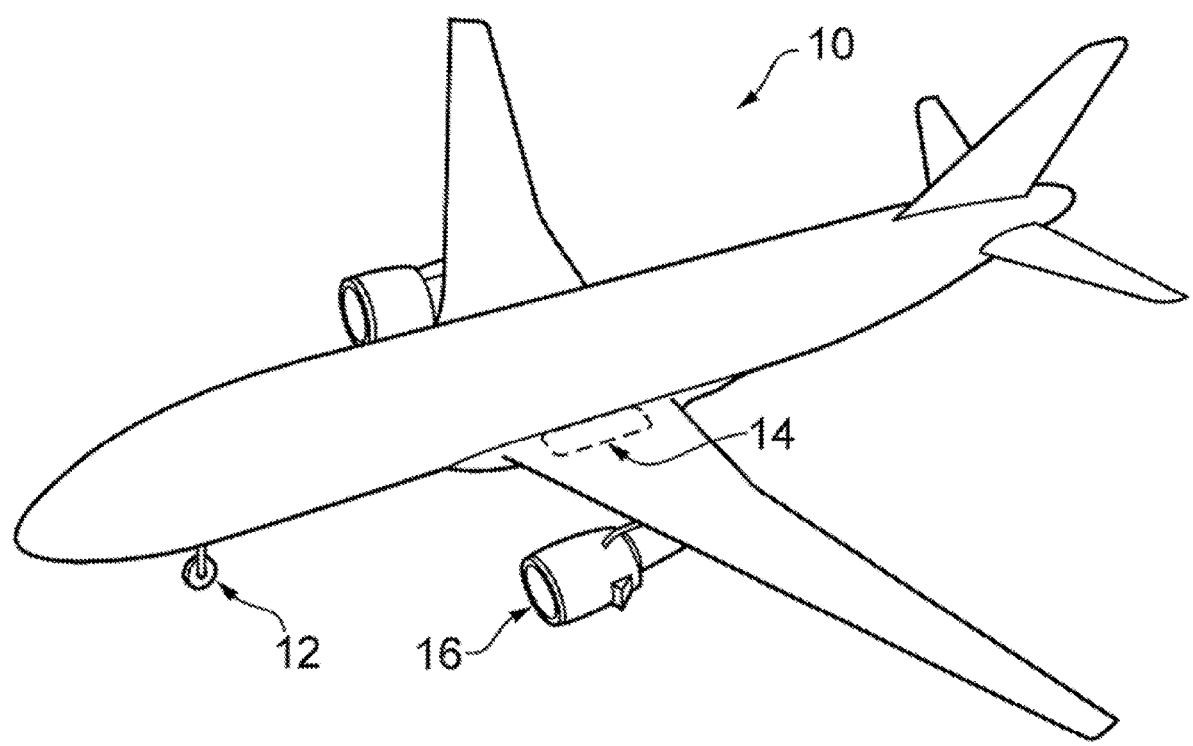
FIG. 1 shows an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. The term aircraft as used herein includes aeroplanes, helicopters and UAVs.

Figure 2:
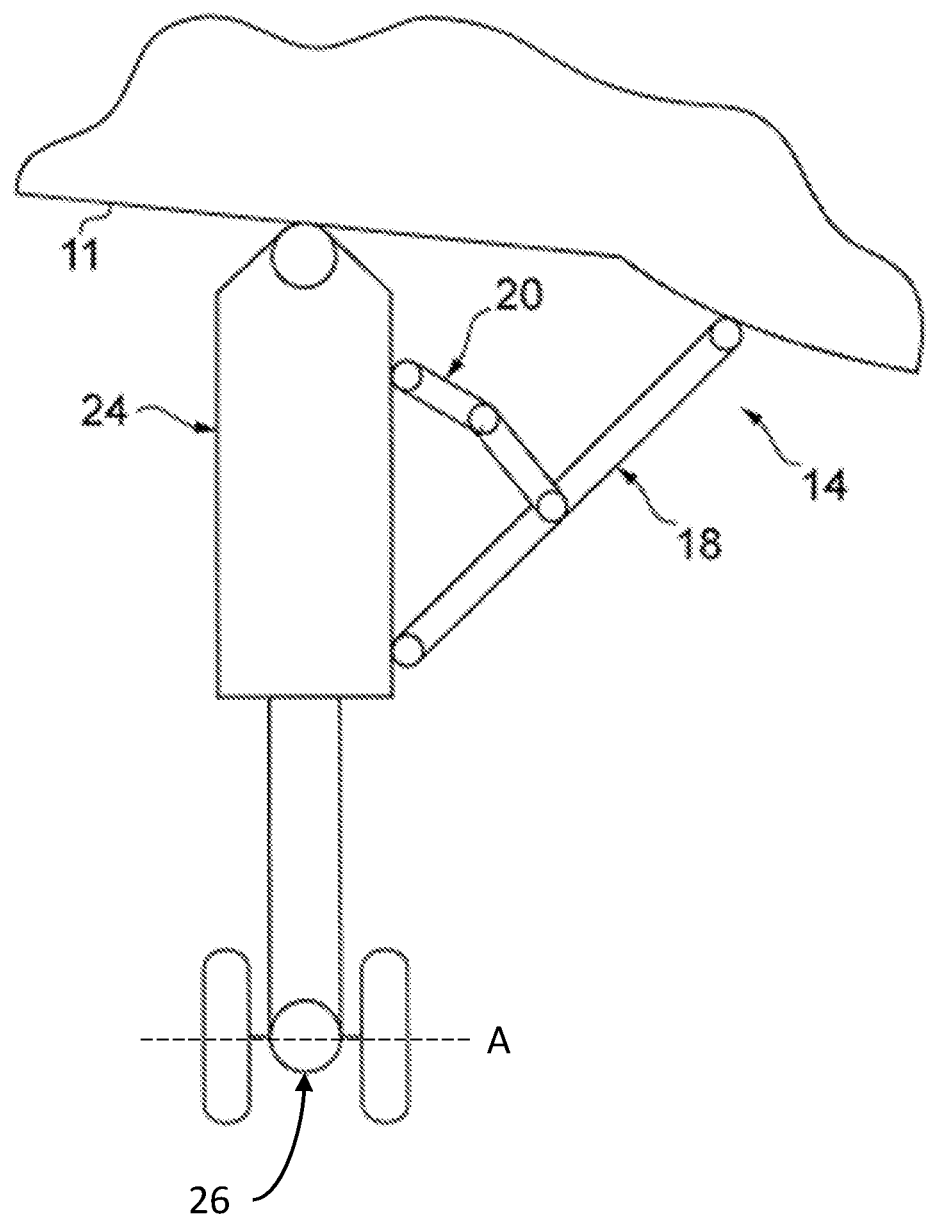
FIG. 2 shows a landing gear.

Referring now to FIG. 2, a main aircraft landing gear 14 includes a foldable stay 18, a lock link 20 and a down lock spring assembly mounted to the stay 18 and arranged to urge the lock link 20 to assume a locked state. The landing gear also includes a main shock absorber strut 24, which is coupled to a bogie beam 26 at its lower end.

The landing gear 14 is shown attached to an airframe 11 and lowered into a deployed position, in which the stay 18 is substantially straight and the bogie beam 26 is disposed away from the airframe 11. It will be understood that the landing gear 14 is pivotally attached to the airframe 11 such that the landing gear can be retracted so that the bogie beam 26 sits substantially within the airframe 11.

When the landing gear 14 is deployed, as shown in FIG. 2, it is arranged below the airframe 11 such that the wheels of the landing gear 14 may contact the ground in order to support the weight of the aircraft 10. The bogie beam 26 is pivotable relative to the shock strut 24 about an axis A.

Figure 3:
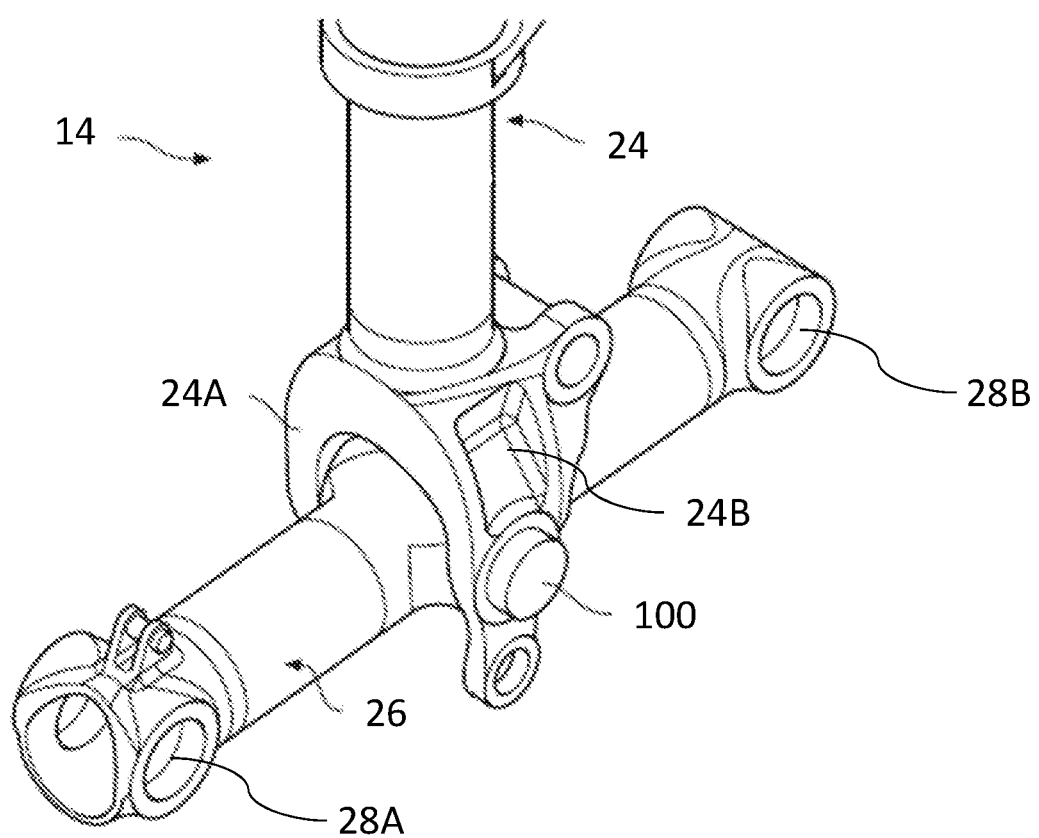
FIG. 3 shows a joint between a strut and a bogie beam in a landing gear.

FIG. 3 shows a more detailed view of the connection between the bogie beam 26 and the shock strut 24. It can be seen that the bogie beam 26 supports two axles (not shown) at ends 28A, 28B.

The shock strut 24, at its lower end, has a yoke, which has two protruding lugs, 24A, 24B. The bogie beam 26 is disposed in between the two lugs, 24A, 24B and the lugs 24A, 24B may be pivotally connected to the bogie beam 26 via one or more journals (not visible in FIG. 3). There may either be one journal extending from each lug 24A, 24B into the bogie beam 26, meaning that there is a total of two journals or there may be one journal extending from a first lug 24A, through the bogie beam 26, to a second lug 24B. Alternatively, the shock strut 24 may extend into a recess in the bogie beam 26.

Figure 4:
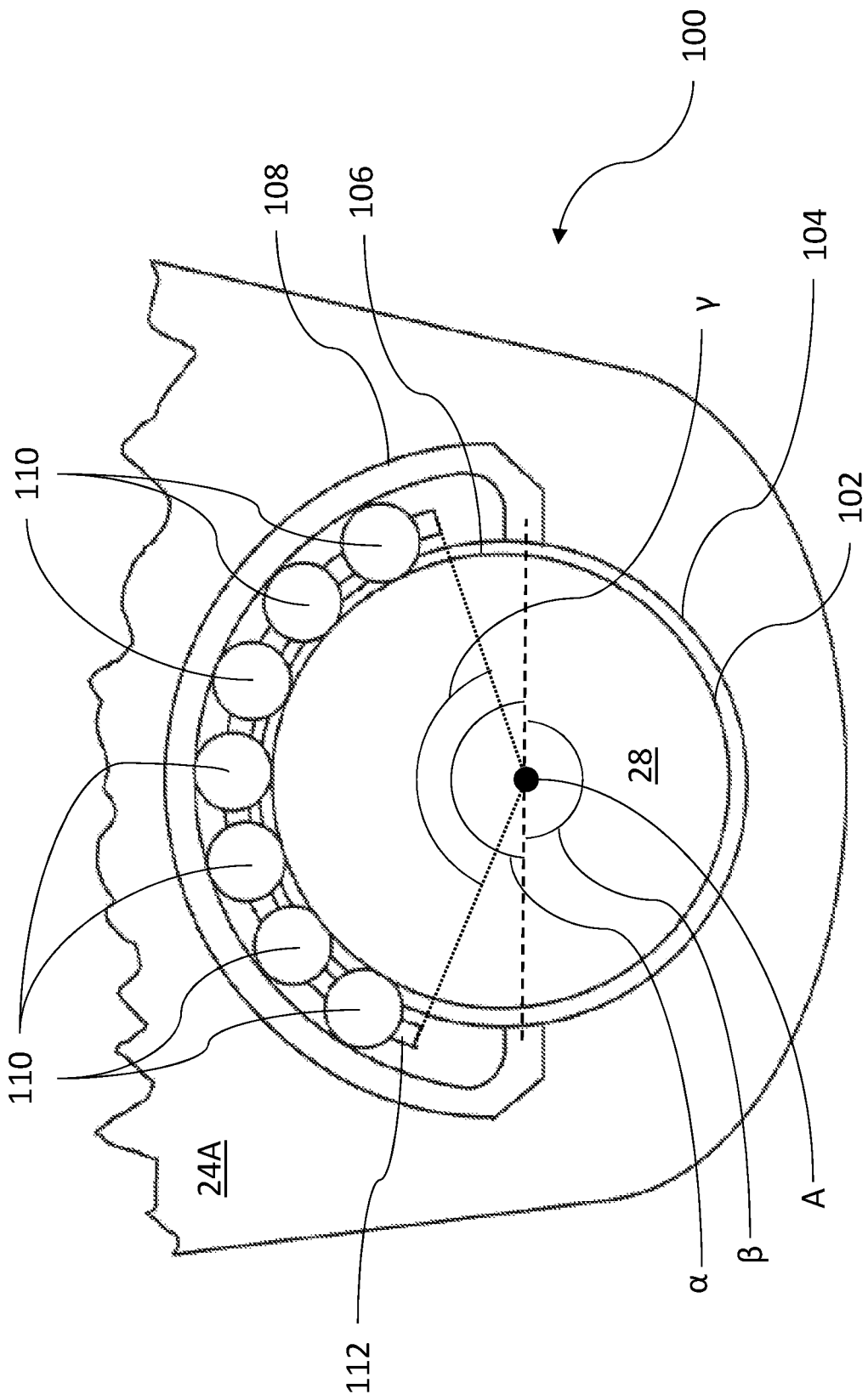
FIG. 4 shows a bearing arrangement according to an embodiment of the invention.

In order to pivotally couple the bogie beam to the lugs, a bearing assembly 100 is used. FIG. 4 shows a bearing assembly 100 according to an embodiment of the present invention. The bearing assembly 100 is formed of a lug 24A, which may be considered a second element of the bearing assembly and a journal 28 which may be considered a first element of the bearing assembly as well as a plurality of roller elements 110. The journal 28 may be a bogie pivot pin. The journal 28 has a first bearing surface 102, which cooperates with and slide along a second bearing surface 104, which is formed in the lug 24A. The journal 28 also has an inner race 106, which is arranged to have a plurality of roller elements 110 rolling along it, the roller elements 110 also roll along an outer race 108, formed in the lug 24A. The first and second bearing surfaces 102, 104 form a plain bearing between the journal 28 and the lug 24A. The plain bearing may further comprise grease in order to reduce friction of the plain bearing. The inner race 106, roller elements 110 and the outer race 108 form a rolling bearing.

The rolling bearing may also be known as a rolling element bearing or a race bearing. The rolling bearing may be a ball bearing, a cylindrical roller bearing, a spherical roller bearing, a gear bearing, a tapered roller bearing or a needle roller bearing or any other type of bearing having intermediate roller elements disposed between inner and outer races.

The inner and outer races 106, 108, may extend around the axis A such that they subtend an angle α. The angle α is less than 360° and may preferably be 180° or less. Generally, rolling bearings have a greater weight than plain bearings. Therefore, it is not desirable to implement an entire rolling bearing on a landing gear. The present inventors have realised that, due to the particular loading and movement which takes place on a landing gear, a bearing arrangement may be used in a landing gear to benefit from the low friction of a rolling bearing without excessively increasing the weight of the bearing arrangement.

The present bearing may be advantageous in situations where there is a significant shear force being transferred across a bearing for example via a shear loading in a pivot pin, the shear force being applied over a narrow range of directions.

In the embodiment shown in FIG. 4, when a downward force is applied to the lug 24A, the rolling bearing will be engaged to carry a substantial portion of the load and therefore the bearing will have a low friction. When an upward force is applied to the lug, for example when a landing gear incorporating the bearing is suspended, the plain bearing will be engaged and so rotation will still be possible, albeit with a greater friction.

By extending the rolling bearing around less than 360°, a lower weight can be used because fewer rolling elements may be used. This can also allow a smaller lug 24A surround the bearing. However, there is the drawback that the bearing cannot rotate about a complete 360°. If the most likely direction of high shear loading on the bearing arrangement 100 is known (for example in a vertical direction), then the rolling bearing and the plain bearing may each extend around angles of 180°. When a rolling bearing extends about more than 180°, the benefit in terms of friction reduction is not greatly increased as no more than 180° the rolling bearing will be engaged when a shear force is to the bearing arrangement. Therefore, a bearing arrangement where the rolling bearing extends about 180° or less may provide a preferable solution taking into account friction and weight considerations.

The plain bearing formed of the first bearing surface 102 and the second bearing surface 104 may extend about the axis A such that the arcuate first and second bearing surfaces 102, 104 subtend an angle β. The angle β may be equal to 360°−α. This may allow a more compact bearing arrangement, in which the rolling bearing and the plain bearing are coplanar, as shown in FIG. 4.

Alternatively, the angle β may be greater than 360°−α, β may be 360°. In such an example, the first and second bearing surfaces 102, 104 may be cylindrical and may be axially offset from the rolling bearing along the axis A. For example, the bearing assembly 100 may have a plain bearing extending around 360° and may have an axially offset rolling bearing extending around an angle of less than 360°.

The rolling bearing may contain only one roller element 110 or, as shown in FIG. 4, may contain a plurality of roller elements 110. Where the rolling bearing contains a plurality of roller elements 110, the roller elements 110 may be coupled to a cage 112, which fixes a spacing between the roller elements 110 such that, as the bearing assembly 100 pivots about axis A, the roller elements 110 do not move closer to or further from their adjacent roller elements 110. The cage 112 may be any type of cage which maintains a spacing between the roller elements 110. The cage 112 may subtend an angle γ at its extremities. The angle γ may be smaller than the angle α such that the roller elements 110 can move within the rolling bearing without contacting the ends of the rolling bearing. Preferably, the angle γ may be smaller than the angle α by at least 10°.

Figure 5:
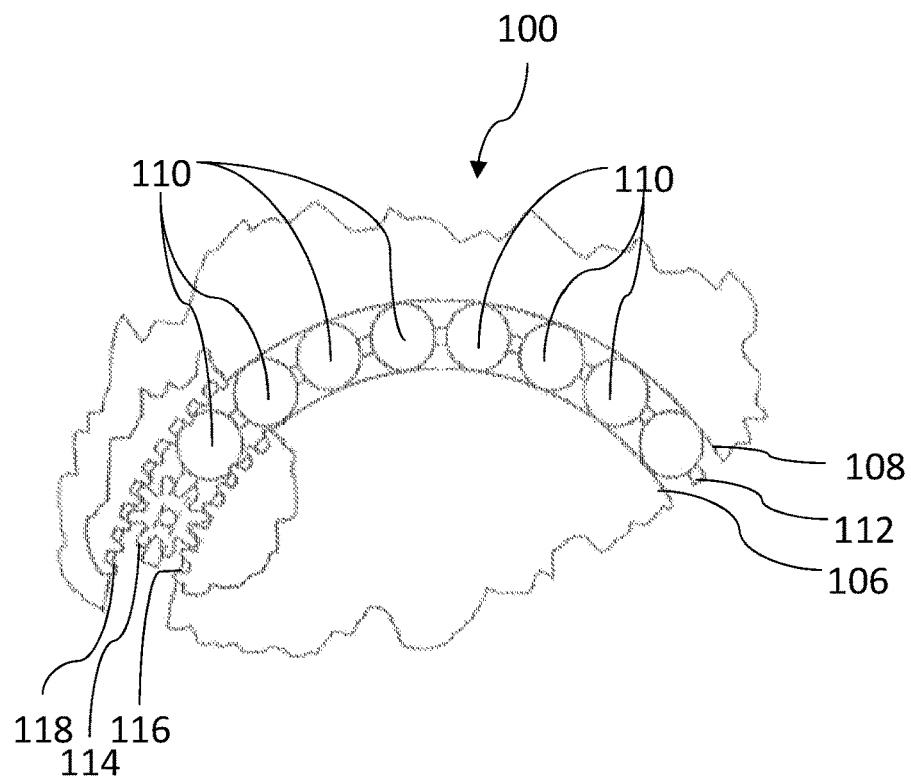
FIG. 5 shows an alternative bearing arrangement according to an embodiment of the invention.

FIG. 5 shows an alternative bearing assembly 100. In this bearing assembly, the roller elements 110 comprise at least one toothed element 114, the inner race 106 comprises a toothed portion 116 and the outer race 108 comprises an outer toothed portion 118. By using a geared roller element 114, which may be coupled to the other roller elements 110 via a cage 112, slippage of the roller elements 110 can be reduced and creep of the roller elements 110 around the rolling bearing can also be reduced. All of the roller elements 110 may be toothed and the entirety of the inner and outer races 106, 108 may be toothed or, as shown in FIG. 5, there may be a single toothed roller element 114 and only a portion of the inner and outer races may be toothed, 116, 118.

The term "creep" as used in this specification is intended to refer to the mechanism by which roller elements may, by slippage for example, move their position within a roller bearing over the course of repeated movement. This can lead to roller elements contacting the end of a roller bearing, which will prevent the roller elements from rolling and can increase friction.

Figure 6:
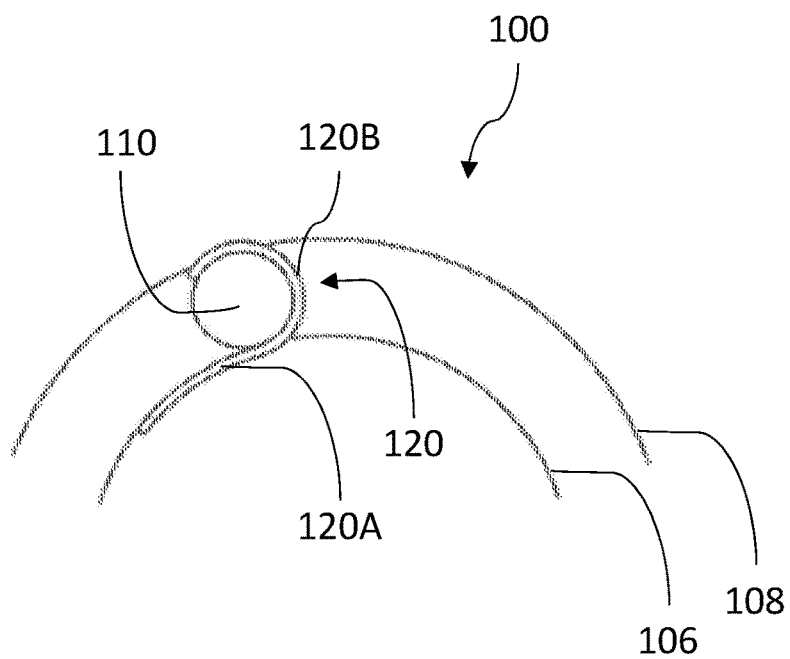
FIG. 6 shows a further alternative bearing arrangement according to an embodiment of the invention.

FIG. 6 shows an alternative bearing assembly 100, in which a tape 120 is attached to the inner race at an attached tape portion 120A and a second portion of the tape 120B extends around a roller element 110. A portion of the tape may, alternatively, be attached to the outer race 108. As the rolling element 110 moves due to rotation of the bearing assembly 100, the tape 120 will be wound further around or unwound from the roller element 110. By attaching the tape 120 to the roller element 110, the roller element 110 may be held in place such that it moves only as a consequence of rotation of the bearing assembly 100. This can reduce creep of the roller element 110.

The roller element 110 shown in FIG. 6 attached to the tape 120 may also be attached to a cage, such as that shown in FIGS. 4 and 5, such that it maintains all roller elements in a correct position.

It may be desirable to have two tapes 120, one disposed around a roller element 110, which may be an end most roller element of the rolling bearing and a second tape disposed around a second roller element 110, which may be at an opposite end of the rolling bearing. This can prevent creep from occurring in either direction around the rolling bearing. Alternatively, springs may be employed at either end of the rolling bearing in order to maintain the rolling elements 110 in a central position.

The invention claimed is:

1. An aircraft landing gear comprising:
   a bogie beam;
   a shock strut coupled to the bogie beam by a bogie pivot pin, and
   a bearing assembly coupled to the bogie beam and the shock strut, the bearing assembly comprising:
      a first element having:
         an inner race, and
         a first bearing surface,
      a second element, pivotable relative to the first element about a first axis, the second element comprising:
         an outer race, and
         a second bearing surface, which is configured to cooperate with the first bearing surface to form a plain bearing, and
      a roller element disposed between the inner race and the outer race to form a rolling bearing,
         wherein the inner race and the outer race are arcuate and subtend an angle of less than 360° about the first axis.

2. The bearing arrangement of claim 1, wherein the inner and outer races subtend an angle of not more than 180° about the axis.

3. The bearing arrangement of claim 1, wherein the first element is a journal.

4. The bearing arrangement of claim 1, wherein the second element is a lug.

5. The bearing arrangement of claim 1, wherein the first bearing surface and the second bearing surface are arcuate.

6. The bearing arrangement of claim 1, wherein the first bearing surface and the inner race form a continuous surface.

7. The bearing arrangement of claim 1, wherein the rolling bearing and the plain bearing are offset in a direction along the first axis.

8. The bearing assembly of claim 1, further comprising a tape coupled to the inner race or to the outer race, and at least partially encircling the roller element.

9. The bearing arrangement of claim 1, wherein the roller element comprises a toothed gear, arranged to engage a corresponding toothed surface of the inner race and/or the outer race.

10. The bearing arrangement of claim 1, wherein the roller element is a first roller element and the bearing arrangement further comprises a second roller element coupled to the first roller element by a cage such that the roller elements maintain a fixed spacing.

11. The bearing arrangement of claim 10, wherein the cage extends from a first cage end to a second cage end, and the inner race and the outer race each subtends an angle at the first axis which is greater than an angle subtended by the first cage end and the second cage end.

12. The bearing arrangement of claim 1, wherein the inner race and the outer race extend along the first axis further than the first bearing surface and the second bearing surface extend along the first axis.

13. The aircraft landing gear of claim 1, wherein:
   the first element is the bogie pivot pin;
   the second element is a lug of the shock strut; and
   the inner race is disposed on an upper side of the bogie pivot pin when the landing gear is deployed.

14. The aircraft landing gear of claim 1, wherein:
   the first element is the bogie pivot pin;
   the second element is a lug of the bogie beam; and
   the inner race is disposed on a lower side of the bogie pivot pin when the landing gear is deployed.

* * * * *